United States Patent [19]

Beltran et al.

[11] 3,904,101

[45] Sept. 9, 1975

[54] METHOD OF BONDING A SHEET CLADDING TO A CONCAVE-CONVEX SUBSTRATE

[75] Inventors: Adrian M. Beltran, Ballston Lake; Robert J. Dybas, Schenectady, both of N.Y.

[73] Assignee: General Electric Company, Schenectady, N.Y.

[22] Filed: Oct. 10, 1974

[21] Appl. No.: 513,853

[52] U.S. Cl. ............... 228/173; 228/175; 228/193; 228/221; 228/243; 29/156.8 B
[51] Int. Cl.² ................. B23P 15/04; B23K 28/02
[58] Field of Search..... 29/494, 497.5, 475, 156.8 B

[56] References Cited
UNITED STATES PATENTS

| | | | |
|---|---|---|---|
| 3,041,040 | 6/1962 | Levinstein | 29/156.8 B |
| 3,071,853 | 1/1963 | Price et al. | 29/494 X |
| 3,699,623 | 10/1972 | Kreider | 29/156.8 B |
| 3,699,642 | 10/1972 | Lange | 29/497.5 |
| 3,862,489 | 1/1975 | Weisinger | 29/497.5 X |

*Primary Examiner*—Al Lawrence Smith
*Assistant Examiner*—K. J. Ramsey
*Attorney, Agent, or Firm*—John F. Ahern; James W. Mitchell

[57] ABSTRACT

A method is disclosed for applying an oxidation resistant-corrosion resistant sheet cladding to a concave-convex substrate, e.g., an airfoil or turbomachine bucket. The sheet cladding is preformed so that it closely conforms to the substrate upon which it is mounted. Thereafter, the clad-substrate is placed in a vacuum furnace and the space between the cladding and substrate is evacuated and all seams are vacuum brazed thereby forming a vacuum envelope between the sheet cladding and substrate. After removal of the clad-substrate assembly from the vacuum furnace, the pressure differential between the vacuum envelope and atmosphere causes the sheet cladding to be closely drawn into the substrate. Thereafter, the clad-substrate assembly is diffusion bonded in an autoclave using a gaseous medium at elevated temperature and pressure.

7 Claims, No Drawings

METHOD OF BONDING A SHEET CLADDING TO A CONCAVE-CONVEX SUBSTRATE

BACKGROUND OF THE INVENTION

This invention was made under contract with the United States Government, Maritime Administration of the Department of Commerce, Contract 0-35510. The U.S. Government is licensed in accordance with the terms of the aforesaid contract and has reserved the rights set forth in Sections 1(f) and 1(g) of the Oct. 10, 1963 Presidential Statement of Government Patent Policy.

In general, this invention relates to a method for diffusion bonding a sheet metal alloy to another alloy substrate. In particular, this invention is a method for metallurgically bonding an oxidation and hot corrosion resistant superalloy to a structural superalloy having convex-concave surfaces such as airfoils, nozzles or buckets.

The surface instability of superalloys looms as a significant problem for advanced industrial, aircraft and marine gas turbines. Highly corrosive environments are generated by the combustion of heavy fuel oils, and when this is combined with higher firing temperatures and longer maintenance intervals, some very strict limitations arise in materials selection. Additionally, further corrosive elements are developed in marine turbine applications due to sea salt ingestion. It has become increasingly difficult to generate both high creep-rupture strength and good corrosion resistance through alloy modifications to the base metal alone due to complex interactions between the elements which generally favor one property at the sacrifice of the other. Various coating and cladding schemes have been developed, the aims of which are to provide, independently, surface protection to an otherwise strong superalloy base. The application of an oxidation and hot corrosion resistant sheet cladding alloy to a bucket or nozzle substrate represents one solution to the surface stability problem.

U.S. Pat. No. 3,699,642 issued Oct. 24, 1972 to Lange shows one method of applying a sheet cladding to an airfoil blade substrate. In that patent, a preformed sheet cladding is loosely mounted on an airfoil substrate. The assembly is then taped and put into a pressure chamber until it is surrounded by a powder pressurizing media. Thereafter, the assembly is subjected to elevated temperature and pressure until the cladding and airfoil substrate are bonded.

It is an object of the present invention to provide an improved method for bonding a sheet cladding to a concave-convex substrate.

It is another object of the present invention to provide a method for bonding a sheet cladding to a complex substrate whereby the use of a powder pressurizing media is obviated.

The method according to the present invention is practiced by closely preforming the sheet cladding to the substrate so that the cladding conforms to the concave and convex surfaces of the substrate. At the same time, the edges of the cladding have been joined to form a longitudinal seam on the convex side of the substrate. The clad-substrate assembly is then placed in a vacuum furnace for evacuating the space between the cladding and substrate and vacuum brazing all seams between the cladding and substrate to establish a vacuum envelope between the cladding and substrate. Removal of the assembly from the vacuum furnace causes a pressure differential between the inside and outside surfaces of the cladding sheet due to the atmospheric pressure outside and the vacuum inside. The pressure differential causes the sheet cladding to be drawn closely into the substrate concave and convex surfaces. Thereafter, the assembly is diffusion bonded by inserting the assembly into an autoclave and applying elevated temperatures, generally below the braze temperature, and gaseous pressure to the assembly.

The novel features believed characteristic of the present invention are set forth in the appended claims. The invention itself, however, together with further objects and advantages thereof may best be understood with references to the following detailed description and examples.

DETAILED DESCRIPTION OF THE INVENTION

The present invention is particularly useful in applying sheet claddings to substrates of complex shapes, e.g., airfoils having convex and concave surfaces. For this reason, and not by way of limitation, the method will be described for bonding a sheet metal cladding to a turbomachine bucket.

EXAMPLE I

In describing the present method, the substrate or bucket material may be IN-738, an alloy obtainable from International Nickel Company. The sheet metal cladding may be Hastelloy X obtainable from Haynes Stellite, a Division of the Cabot Corporation. The sheet cladding material may be on the order of 1–15 mils in thickness. The sheet cladding must be preformed to conform as closely as possible to the bucket substrate. One method for accomplishing the preforming step is described in U.S. Pat. Application Ser. No. 513,852 filed Oct. 10, 1974, to Beltran and Schilling entitled "Preforming a Cladding Sheet to a Convex/Concave Substrate" and assigned to the assignee of the present invention. According to the aforesaid patent application the sheet cladding is annealed and cut into a template which roughly approximates the unfolded shape of the bucket allowing for 10 to 15 percent sheet cladding elongation during the application of cold isostatic pressure. The sheet cladding is shaped over the bucket substrate so that it closely conforms to the convex surface while it remains relatively undeformed with respect to the concave surface. Thereafter, one edge of the cladding is spotwelded to the convex surface of the bucket while the opposite edge is lapped to the first edge to define a longitudinal seam along the convex surface. The assembled clad-bucket substrate is then put into a cold isostatic pressing apparatus whereupon the sheet cladding opposite the concave surface is pushed (deformed) into the concave surface so that the cladding closely conforms to the bucket substrate concave and convex surfaces.

The clad-substrate assembly is placed in a vacuum furnace to form a vacuum envelope between the cladding sheet and the substrate. This step is performed by evacuating the space between the cladding sheet and the substrate and thereafter vacuum brazing all seams between the cladding and substrate. A suitable vacuum may be on the order of $10^{-3}$ torrs. The brazing alloy may be Nicrobraze 30 (Ni 19 Cr 10 Si) obtainable from Wall-Colmonoy Corp. and suitable furnace conditions may be 2,175°F for 2 minutes. It is important that the hot isostatic pressing temperature generally be held below the prior vacuum brazing temperature to preclude remelting of the braze alloy and disruption of seam integrity and the vacuum envelope. Therefore selection of the braze alloy is dependent upon the diffusion bonding parameters required for the particular cladding substrate alloy combination. After the vacuum brazing step is complete, the clad-substrate assembly is exposed to atmospheric pressure. A pressure differential exists between the inside and outside sheet cladding surfaces which causes the sheet cladding to be further closely drawn into the substrate.

The vacuum brazed clad-substrate assembly is then placed in a hot isostatic pressure autoclave for diffusion bonding. The effectiveness of the diffusion bonding step is greatly enhanced by the vacuum brazing process due to the prior close fit of the sheet cladding and substrate and the vacuum envelope therebetween. The vacuum envelope also precludes oxidation or other contamination of the sheet cladding and substrate surfaces to be bonded, which may arise during hot isostatic pressing. Moreover, the diffusion bonding step, according to the present method, employs a gaseous pressurizing medium, for example, argon which is possible because of the vacuum envelope established and the vacuum brazing of the clad-substrate seams. The use of the gaseous medium rather than a powder medium obviates the possibility of powder particles falling between the cladding and substrate during diffusion bonding and further obviates the use of taping material between the cladding and substrate peripheries. Powdered mediums, such as oxides, carbides, nitrides, etc., of the prior art, are likely to contain water and other contaminants, which are released upon heating. Any leaks between the substrate and cladding would inhibit bond effectiveness. In the present example, hot-gas isostatic pressure is applied at 2150°F and 15 KSI for a period of 3 hours. The desired bond is obtained by the interdiffusion of molecules across the cladding substrate interface.

EXAMPLE II

In another example, a disk substrate IN-738 was clad with FeCrAlY 2541 alloy; the alloy cladding being 8 to 10 mils in thickness. The braze alloy was Nicrobraze 30 at 2,150°F and 2 minutes time. The hot gas isostatic pressing was at 2,000°F, 15 KSI for 2 hours time.

EXAMPLE III

In still another example, an IN-738 disk substrate was clad with a NiCrAlSi 2041 (NI) alloy of 8–10 mils thickness. The braze alloy was Nicrobraze 30 at 2,150°F for 2 minutes time. The hot gas isostatic pressure was at 2,000°F, 10 KSI for 2 hours.

EXAMPLE IV

In a final example, a Rene 80 disk substrate was clad with an FeCrAlY 2541 alloy; the alloy cladding being 8–10 mils in thickness. The braze alloy was Nicrobraze 30 at 2,150°F for 2 minutes time. The hot gas isostatic pressing was 2,200°F for 30 minutes at 15 PSI pressure. Note that in this example the HIP temperature was higher than the braze temperature. This is because the braze remelt temperature was increased during the vacuum brazing step.

Depending on the materials used, the desired diffusion bonding according to the present method may be achieved at hot gas isostatic pressures above 15 PSI, by varying the temperatures between 1,900° and 2,300°F at elapsed times in excess of 10 minutes at pressure. However, it should be noted that the hot isostatic pressing temperature is generally below the braze temperature.

While there has been shown what is considered to be the preferred embodiment of the present invention, other modifications may occur to those skilled in the art; and, it is intended to cover in the appended claims all such modifications as fall within the true spirit and scope of the invention.

What is claimed is:

1. A method of bonding a sheet cladding to a substrate, the substrate having concave and convex surfaces; the method comprising the steps of:
   a. preforming the sheet cladding to the substrate so that the cladding closely conforms to the substrate concave and convex surfaces;
   b. evacuating the space between the cladding and the substrate;
   c. vacuum brazing all seams between the cladding sheet and substrate; and,
   d. diffusion bonding the cladding sheet and substrate at elevated temperature and pressure in a gaseous medium.

2. The method recited in claim 1 wherein preforming the sheet cladding further comprises the steps of:
   a. shaping the sheet cladding to the substrate so that the cladding conforms to the convex surface of the substrate and is relatively undeformed with respect to the concave surface;
   b. assembling the sheet cladding to the substrate at a seam located on the convex surface;
   c. placing the sheet cladding and substrate in a rubbery mold; and,
   d. applying isostatic pressure to the mold to deform the sheet cladding into the substrate concave surface.

3. The method recited in claim 1 further comprising the step of forming a pressure differential between the inside and outside cladding surfaces prior to the diffusion bonding step.

4. A method of bonding a sheet cladding to a substrate, the substrate having concave and convex surfaces; the method comprising the steps of:
   a. attaching the sheet cladding around the substrate so that the cladding conforms to the convex surface of the substrate;
   b. applying cold isostatic pressure to the cladding and substrate so that the cladding conforms to the concave surface of the substrate;
   c. evacuating the space between the sheet cladding and substrate;
   d. vacuum brazing all seams between the sheet cladding and substrate to form a vacuum envelope between the cladding and substrate; and,
   e. diffusion bonding the sheet cladding to the substrate by applying hot gas isostatic pressure at elevated temperature and pressure.

5. The method recited in claim 4 wherein the diffusion bonding step is generally carried out at a lower temperature than the vacuum brazing step.

6. The method recited in claim 4 wherein the diffusion bonding step is carried out at temperatures on the order of 2,000°F.

7. The method recited in claim 4 wherein the diffusion bonding step is carried out at pressures from 15 PSI to 15 KSI.

* * * * *